Oct. 6, 1942.  A. EPPLER, JR., ET AL  2,297,697
LASTING MACHINE
Filed Feb. 21, 1941  2 Sheets—Sheet 2

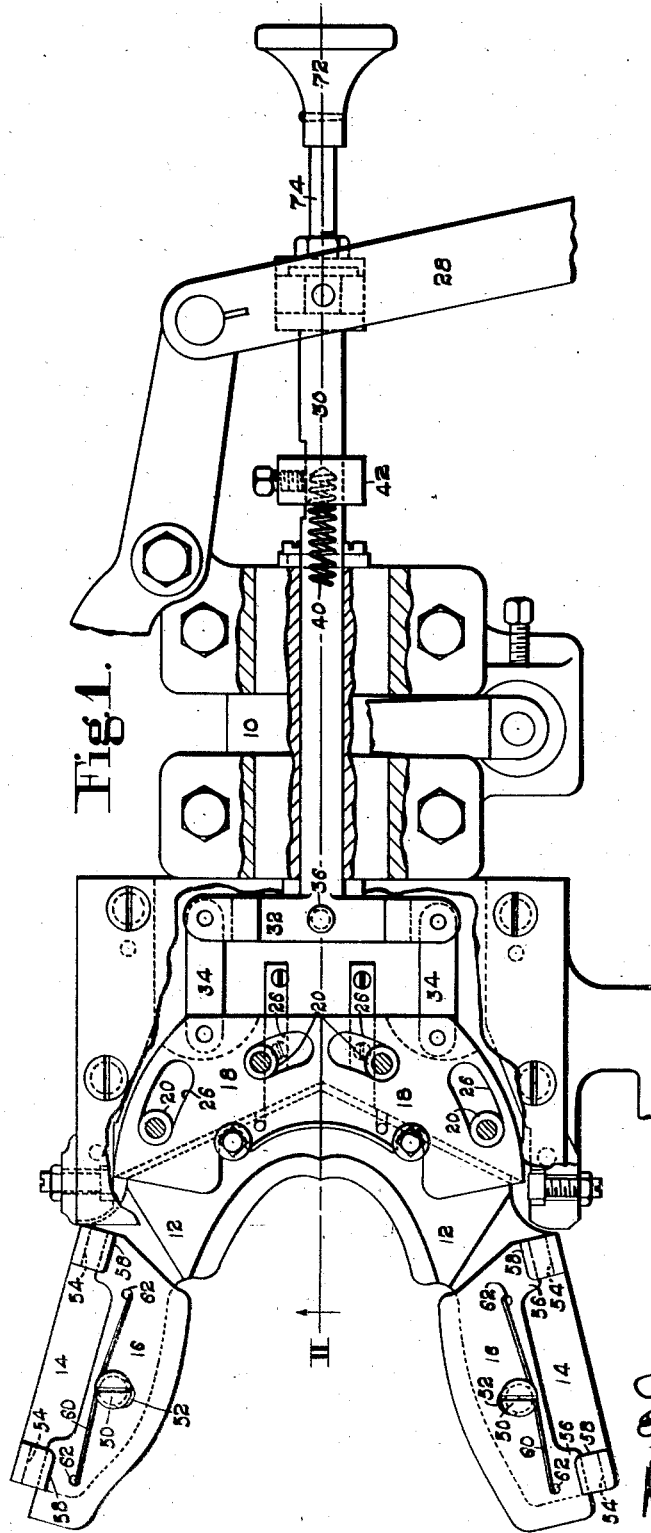
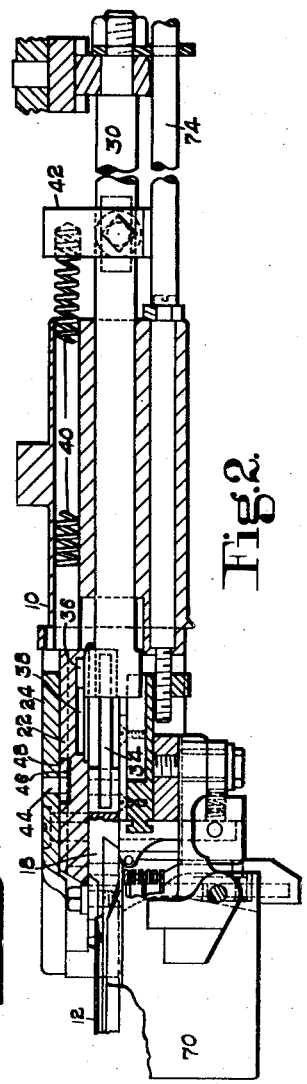

Patented Oct. 6, 1942

2,297,697

UNITED STATES PATENT OFFICE 2,297,697

LASTING MACHINE

Andrew Eppler, Jr., and Ernest L. Butler, Lynn, Mass., assignors to United Shoe Machinery Corporation, Flemington, N. J., a corporation of New Jersey Application February 21, 1941, Serial No. 380,028

11 Claims. (Cl. 12—14)

This invention relates to lasting machines and lasting wipers therefor and is herein illustrated as embodied in a machine particularly adapted to last that type of prewelt shoe in which the welt terminates at the heel breast line and the non-welted margin of the heel end of the upper is lasted inwardly and tacked to an insole. It is to be understood, however, that the invention is not limited in its scope to lasting machines or wipers for lasting prewelt shoes of the type above described, the invention in certain aspects being applicable to lasting machines or wipers, or wiper assemblies, adapted to last other types of prewelt shoes. Moreover, in certain aspects, the invention is not limited in scope to prewelt lasting machines or wipers but is applicable to lasting machines generally.

It is an object of the present invention to provide a lasting wiper organization in a prewelt lasting machine calculated to facilitate and expedite the lasting of prewelt uppers of the type above described. With this object in view, the invention in one aspect consists in the provision of a lasting wiper assembly comprising an end wiper, herein illustrated as a heel wiper, constructed and arranged to be removably mounted in a lasting machine, such, for example, as that illustrated in United States Letters Patent No. 2,212,512, granted August 27, 1940, on an application of William S. Dallas, said end wiper having an extension constructed and arranged to serve as a carrier for a side wiper, said end wiper and side wiper being constructed and arranged for relative operative movement. As herein illustrated, the extension of the heel wiper is offset downwardly from the rear portion of the heel wiper so that the side wiper mounted thereon will be positioned to enter the welt crease at one side of the upper. The illustrated side wiper, in accordance with a further feature of the invention, is mounted on said extension for swinging movement about an axis extending at right angles to the welt-engaging surface of the wiper in order to enable the wiper to adjust itself to the peripheral contour of that portion of the upper on which it operates. In accordance with a further feature of the invention, the side wiper is mounted on said extension for bodily movement relatively to said extension toward and from the shoe, and in the construction illustrated the wiper assembly includes yielding means for moving the side wiper relatively to said extension toward the side of the shoe. This organization of the wiper assembly permits a continued operation of the heel wiper after the side wiper has come to the limit of its movement. This continued operation of the heel wiper has a twofold purpose; first, it insures a complete overwiping of the heel end of the upper and, secondly, it permits a slight retraction of the heel wiper without disturbing the side wiper to enable the operator to tack the overlasted margin to the insole.

In lasting prewelt shoes of the type above described, it is desirable to advance the wiper assembly bodily with the wipers in their open relation until the side wipers have been brought into registration with that portion of the welted margin on which they are intended to operate. Accordingly, the illustrated machine is provided with a member constructed and arranged to direct and control the closing movements of said wipers but movable with the wipers during their bodily advancing movement in their wide open relation, such bodily movement being terminated by a fixed stop constructed and arranged to arrest the movement of said member after the heel wipers have completed their overwiping of the back seam portion of the upper.

These and other features of the invention will now be described with reference to the accompanying drawings and pointed out in the appended claims.

In the drawings,

Fig. 1 is a plan view of the heel head of a bed lasting machine embodying the features of the present invention, certain parts being broken away and other parts shown in section;

Fig. 2 is a sectional elevation on the line II of Fig. 1;

Figure 3:
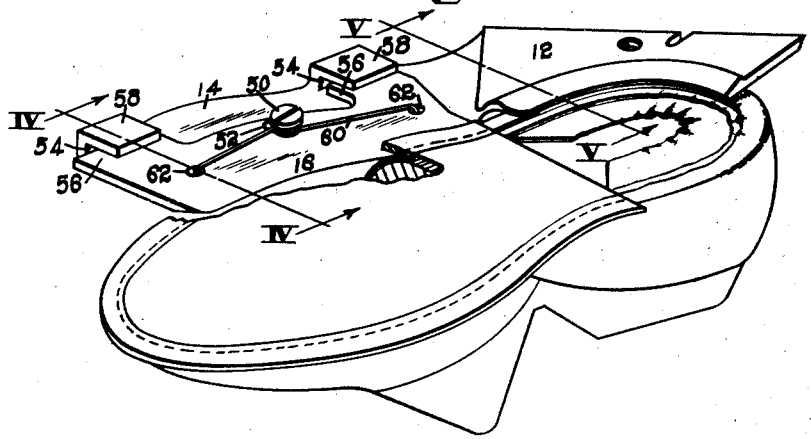
Fig. 3 is a perspective view illustrating the operation of one heel and side wiper assembly on a prewelt shoe, part of which is broken away to expose the wiping edge of the side wiper.

In Figs. 1 and 2 there is illustrated a prewelt lasting machine which is substantially the same in its general organization and in most of its details of construction as the machine illustrated in the Dallas patent hereinbefore referred to. The illustrated machine is provided with a heel head 10 which carries heel end lasting wipers 12 having downwardly offset, forward extensions 14 which carry side lasting wipers 16, the construction and arrangement of which are hereinafter described. The heel wipers 12 are mounted on wiper carriers 18 and their closing movements are directed and controlled by rolls 20 carried by a plate 22 (Fig. 2) tongued to a cover plate 24 for rectilinear sliding movement toward and from the heel end of a shoe in the machine. The rolls 20 operate in concentric curved slots 26 in the wiper carriers 18. The wipers are actuated by the usual hand lever 28 connected to a slide rod 30 having at one end a crosshead 32 the ends of which are connected by links 34 to the wiper carriers. A short stud 36 extends upwardly from the center of the crosshead into a groove 38 in the bottom of the plate 22 and a compression spring 40 confined between the plate 22 and a collar 42 on the slide rod 30 yieldingly holds the plate 22 in its position relatively to the slide rod 30, illustrated in Fig. 2, with the stud 36 at the right end of said groove in contact with a shoulder at the end of the groove. In the operation of the wipers, the entire wiper assembly including the wiper carriers 18 and the plate 22 advance as a unit until the plate 22 is arrested by a pin 44 which extends downwardly from the cover plate 24 into a groove 46 in the upper surface of the plate 22. The pin 44 is so arranged with relation to the groove 46 that the end wall 48 of the groove engages the pin to arrest the advancement of the plate 22 as the heel wipers 12 complete the overwiping of the back-seam portion of the upper. As the slide rod 30 is further advanced by the hand lever 28 the wiper carriers 18 move relatively to the plate 22 to close the wipers widthwise of the shoe to complete the lasting of the heel end and to cause the side wipers 16 to enter the welt crease and overwipe the welted margin at opposite sides of the shoe.

Figure 4:
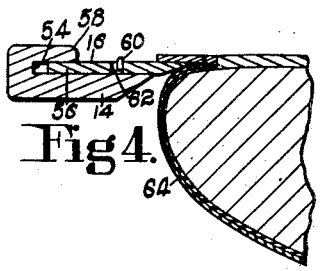
Fig. 4 is a section on the line IV—IV of Fig. 3.
Figure 5:
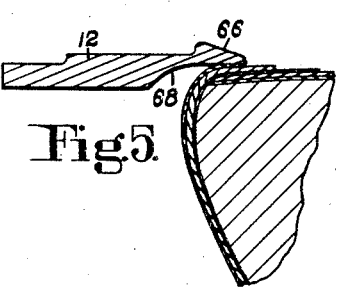
Fig. 5 is a section on the line V—V of Fig. 3.

In order to permit the heel wipers 12 to continue and complete their closing movements after the side wipers have come to the limit of their overwiping movements, the side wipers 16 are mounted on the extensions 14 of the heel wipers 12 for movements relatively to said extensions widthwise of the shoe. As shown in Fig. 3, this movement of each of the side wipers is limited by a headed pin 50 extending through a slot 52 in the side wiper and into the extension 14. The side wipers are free to swivel on the pins 50 to a limited extent to enable them to adjust themselves to the peripheral contour of the shoe bottom. To limit the swiveling action of the side wipers each extension 14 has upwardly extending shoulders 54 arranged to engage extensions 56 of the side wiper. To prevent each side wiper from rising away from the extension 14 the shoulders 54 are provided with tongues 58 which extend inwardly over the extensions 56 of the side wiper. Each side wiper is yieldingly urged toward the shoe by a torsion spring 60 mounted on the headed pin 50, the ends of the spring being extended and turned downwardly at their extremities for engagement within holes 62 provided in the wiper. Thus, it will be seen that after the side wipers have completed their overwiping movements, the extensions 14 of the heel wipers may continue to move inwardly toward the shoe to the extent of the length of the slots 52 in the side wipers to permit the heel wipers to complete their overwiping movements. As illustrated in Fig. 4, each side wiper is provided with a thin beveled wiping margin which is well adapted to operate within the welt crease of a prewelt upper such as the upper 64. Referring to Fig. 5, the overwiping margin 66 of each heel wiper 12 is upwardly offset from the body portion of the wiper the lower portion of which is cut away at 68 to provide clearance for the movement of the wiper. This construction of the heel wiper makes it possible to locate the side wiper at the desired operating elevation without greatly offsetting the body portion of the heel wiper from its side wiper carrying extension 14.

The shoe is positioned relatively to the wipers by a heel band 70 (Fig. 2) which may be adjusted lengthwise of the shoe by means illustrated in the Dallas patent hereinbefore referred to, such adjustment being effected by turning a knob 72 (Fig. 1) secured to a rotary shaft 74.

In order to expose a sufficient width of the overlasted margin at the heel end of the upper to enable the operator to tack said margin to the insole, the heel-end wipers 12 are opened slightly after the wiping operation has been completed. This retraction of the heel wipers need not and should not be of sufficient extent to cause any retraction of the side wipers. In accordance with the usual practice, the lasting tacks are driven by means of a hand tacker such as that illustrated in Fig. 11 of United States Letters Patent No. 1,018,477, granted February 27, 1912, on an application of Matthias Brock. In order to obviate the possibility of damage to the heel end wipers by the hand tacker, the overwiping margin 66 is made substantially thicker than the adjacent thin portion of the wiper and its top face is arranged to slope downwardly toward its edge so that the hand tacker would be deflected from the wiper should it accidentally come in contact therewith.

While the illustrated lasting wipers are constructed and arranged to operate on a prewelt shoe of the type in which the welt terminates at the heel breast line, it will be understood that the illustrated heel and side wiper assembly could readily be adapted to operate on that type of prewelt shoe in which the upper is welted around the heel end, in which case the heel wipers as well as the side wipers would be constructed and arranged to operate within the welt crease. In operating on prewelt shoes of the latter type, the illustrated wiper assembly would permit a freedom of movement of the side wipers relatively to the heel wipers which would insure a complete overwiping of the welted margin of the upper throughout the entire range of operation of the wipers.

Having thus described our invention, what we claim as new and desire to secure by Letters Patent of the United States is:

1. A lasting wiper assembly comprising an end wiper constructed and arranged to be removably mounted in a lasting machine, a side wiper, an extension of said end wiper constructed and arranged to serve as a carrier for the side wiper, said end wiper and side wiper being constructed and arranged for relative operative movement, and a common actuator for said wipers.

2. A lasting wiper assembly comprising an end wiper constructed and arranged to be removably mounted in a lasting machine, a side wiper, and a forward extension of said end wiper offset downwardly from the rear portion of the wiper and arranged to serve as a carrier for the side wiper.

3. A lasting wiper assembly comprising an end wiper having an extension which serves as a wiper carrier and a side lasting wiper mounted on said extension for swinging movement about an axis extending at right angles to the upper surface of the side wiper and for bodily movement relatively to said extension toward and from a shoe.

4. A lasting wiper assembly comprising an end wiper constructed and arranged to be removably mounted in a lasting machine, said end wiper having an extension which serves as a wiper carrier, a side lasting wiper mounted on said extension, and yielding means carried by said extension for moving the side wiper relatively to said extension toward the side of a shoe in the machine.

5. A lasting wiper assembly comprising an end wiper having an extension which serves as a wiper carrier and a side lasting wiper mounted on said extension for swinging movement about an axis extending at right angles to the upper surface of the side wiper and for bodily movement relatively to said extension toward and from a shoe, and yielding means carried by said extension for moving the side wiper relatively to said extension toward the shoe.

6. A lasting wiper assembly comprising an end wiper and a side wiper carried by the end wiper, said end wiper and side wiper being constructed and arranged for relative operative movement, and a common actuator for said wipers, said side wiper being constructed and arranged to operate within the welt crease of a prewelt upper while the end wiper is constructed and arranged to operate on a non-welted portion of the lasting margin.

7. A wiper assembly for use in lasting prewelt uppers in which the welt does not extend around the heel end, comprising a heel wiper constructed and arranged to be removably mounted in a lasting machine, a side wiper constructed and arranged to operate within the welt crease, and an extension of said end wiper downwardly offset from the rear portion of the wiper and constructed and arranged to serve as a carrier for the side wiper.

8. A lasting wiper assembly comprising an end wiper and a side wiper carried by the end wiper, said side wiper being constructed and arranged to operate within the welt crease of a prewelt upper while the end wiper is constructed and arranged to operate on a non-welted portion of the lasting margin, and a yielding connection between the end wiper and the side wiper constructed and arranged to permit the end wiper to continue its closing movement after the side wiper has completed its operation.

9. A lasting wiper assembly comprising an end wiper having a raised wiping margin which is beveled toward the wiping edge of the wiper, a side wiper, and an extension of said end wiper offset from the main portion of the wiper to arrange it to support the side wiper in wiping position.

10. In a lasting machine, a pair of end-lasting wipers constructed and arranged to operate on a non-welted margin of a shoe upper, a member constructed and arranged to direct and control closing movements of said wipers on the end portion of the shoe, said member being movable with the wipers toward the end portion of the shoe to cause the wipers to advance bodily in their wide-open position to overwipe the extremity of the upper before they begin to close to last the opposite sides of the end portion, and a fixed stop for arresting the movement of said member after the overwiping of the extremity of the upper has been completed.

11. In a lasting machine, a pair of end lasting wipers constructed and arranged to operate on a non-welted margin of a shoe upper, a plate constructed and arranged for rectilinear movement toward and from an end portion of the shoe upper, means carried by the plate for directing and controlling closing of said wipers on the end portion of the shoe upper as the wipers move relatively to said plate, said plate being movable with the wipers toward the end portion of the shoe upper to cause the wipers to advance bodily in their wide open position to overwipe the extremity of the upper before they begin to close to last the opposite sides of the end portion, and means for arresting such movement of said plate after the overwiping of the extremity of the upper has been completed.

ANDREW EPPLER, Jr.
ERNEST L. BUTLER.